(12) United States Patent
Ogaki et al.

(10) Patent No.: US 10,733,964 B2
(45) Date of Patent: Aug. 4, 2020

(54) INFORMATION PROCESSING APPARATUS AND PROGRAM

(71) Applicant: EIZO Corporation, Ishikawa (JP)

(72) Inventors: Mamoru Ogaki, Ishikawa (JP); Hiroki Matsuzaki, Ishikawa (JP); Reo Aoki, Ishikawa (JP); Takashi Nakamae, Ishikawa (JP); Masafumi Higashi, Ishikawa (JP); Keita Hashi, Ishikawa (JP); Takuya Matsuda, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 16/465,710

(22) PCT Filed: Dec. 5, 2016

(86) PCT No.: PCT/JP2016/086020
§ 371 (c)(1),
(2) Date: May 31, 2019

(87) PCT Pub. No.: WO2018/104993
PCT Pub. Date: Jun. 14, 2018

(65) Prior Publication Data
US 2019/0304410 A1    Oct. 3, 2019

(51) Int. Cl.
*G09G 5/391* (2006.01)
*G06F 7/58* (2006.01)
*G06F 17/18* (2006.01)
*H04N 5/66* (2006.01)
*G09G 5/00* (2006.01)

(52) U.S. Cl.
CPC .............. *G09G 5/391* (2013.01); *G06F 7/588* (2013.01); *G06F 17/18* (2013.01); *G09G 5/00* (2013.01); *H04N 5/66* (2013.01)

(58) Field of Classification Search
CPC .................. G06F 7/588; G09G 2340/0428
See application file for complete search history.

(56) References Cited

U.S. PATENT DOCUMENTS

2008/0158033 A1    7/2008   Doi et al.
2012/0188609 A1*   7/2012   Kuno ................. G06K 15/188
                                              358/3.02

FOREIGN PATENT DOCUMENTS

JP    H06-62280 A      3/1994
JP    2000-231368 A    8/2000
JP    2008-181081 A    8/2008

OTHER PUBLICATIONS

International Search Report dated Feb. 14, 2017 in corresponding International Application No. PCT/JP2016/086020; 2 pages.

* cited by examiner

*Primary Examiner* — Phi Hoang
(74) *Attorney, Agent, or Firm* — Maier & Maier, PLLC

(57) ABSTRACT

Provided are an information processing apparatus and program that are able to improve representable gradations in a pseudo manner while reducing flicker including a random number generator configured to generate a random number sequence; a comparator configured to make a comparison between a threshold and a random number value, the threshold being associated with any number of lower bits, the any number of lower bits forming input image data with any number of upper bits, the random number value forming the random number sequence.

13 Claims, 11 Drawing Sheets

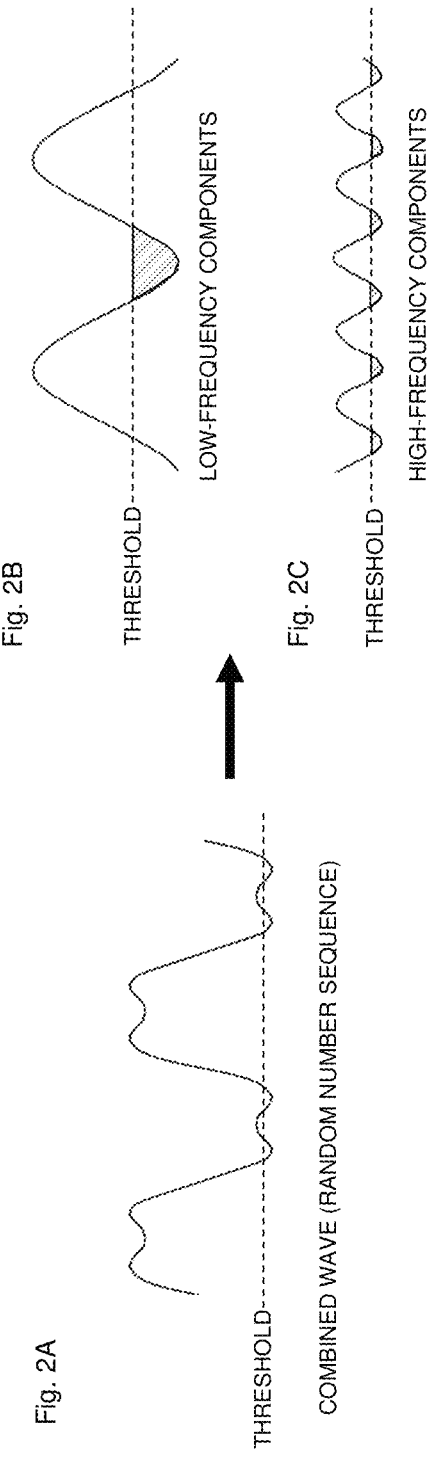

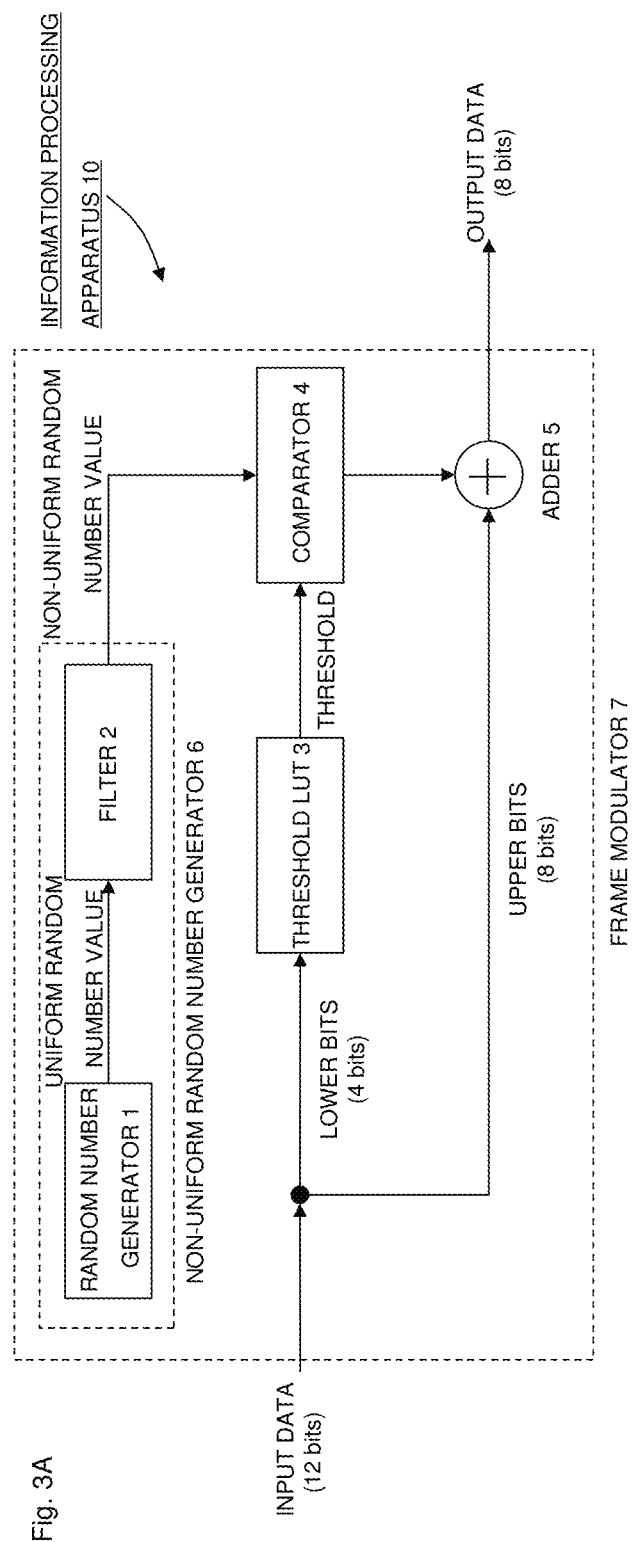
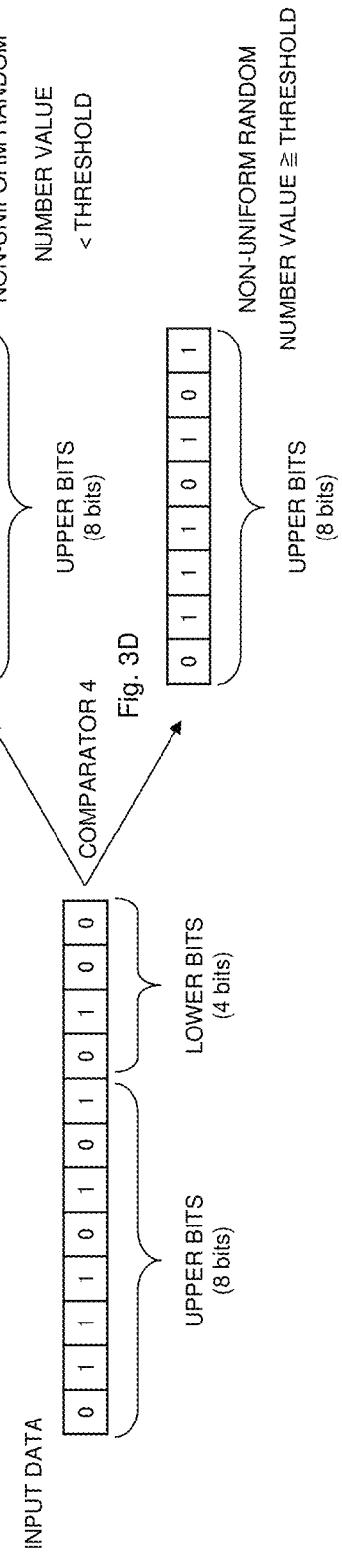
Fig. 3A
Fig. 3B
Fig. 3C
Fig. 3D

| LOWER BITS | LOWER-BITS VALUE | |
|---|---|---|
| 0000 | 0.000 | |
| 0001 | 0.0625 | = + 1/16 |
| 0010 | 0.125 | = + 2/16 |
| 0011 | 0.1875 | = + 3/16 |
| 0100 | 0.25 | = + 4/16 |
| 0101 | 0.3125 | = + 5/16 |
| 0110 | 0.375 | = + 6/16 |
| 0111 | 0.4375 | = + 7/16 |
| 1000 | 0.5 | = + 8/16 |
| 1001 | 0.5625 | = + 9/16 |
| 1010 | 0.625 | = + 10/16 |
| 1011 | 0.6875 | = + 11/16 |
| 1100 | 0.75 | = + 12/16 |
| 1101 | 0.8125 | = + 13/16 |
| 1110 | 0.875 | = + 14/16 |
| 1111 | 0.9375 | = + 15/16 |

Fig. 4

| t'/t | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0 | 0 | 0.1 | 0.2 | 0.3 | 0.4 | 0.5 | 0.6 | 0.7 | 0.8 | 0.9 | 1 |
| 0.1 | -0.1 | 0 | 0.1 | 0.2 | 0.3 | 0.4 | 0.5 | 0.6 | 0.7 | 0.8 | 0.9 |
| 0.2 | -0.2 | -0.1 | 0 | 0.1 | 0.2 | 0.3 | 0.4 | 0.5 | 0.6 | 0.7 | 0.8 |
| 0.3 | -0.3 | -0.2 | -0.1 | 0 | 0.1 | 0.2 | 0.3 | 0.4 | 0.5 | 0.6 | 0.7 |
| 0.4 | -0.4 | -0.3 | -0.2 | -0.1 | 0 | 0.1 | 0.2 | 0.3 | 0.4 | 0.5 | 0.6 |
| 0.5 | -0.5 | -0.4 | -0.3 | -0.2 | -0.1 | 0 | 0.1 | 0.2 | 0.3 | 0.4 | 0.5 |
| 0.6 | -0.6 | -0.5 | -0.4 | -0.3 | -0.2 | -0.1 | 0 | 0.1 | 0.2 | 0.3 | 0.4 |
| 0.7 | -0.7 | -0.6 | -0.5 | -0.4 | -0.3 | -0.2 | -0.1 | 0 | 0.1 | 0.2 | 0.3 |
| 0.8 | -0.8 | -0.7 | -0.6 | -0.5 | -0.4 | -0.3 | -0.2 | -0.1 | 0 | 0.1 | 0.2 |
| 0.9 | -0.9 | -0.8 | -0.7 | -0.6 | -0.5 | -0.4 | -0.3 | -0.2 | -0.1 | 0 | 0.1 |
| 1 | -1 | -0.9 | -0.8 | -0.7 | -0.6 | -0.5 | -0.4 | -0.3 | -0.2 | -0.1 | 0 |

Fig. 6

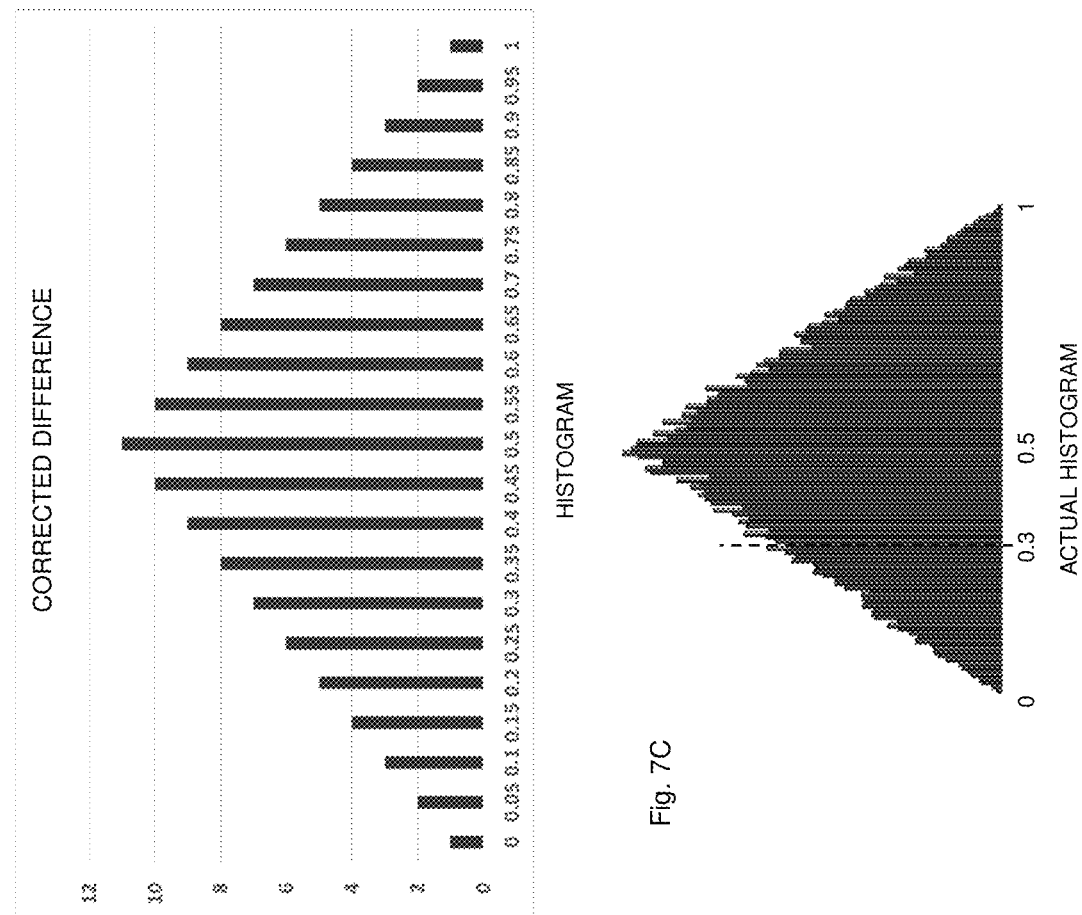

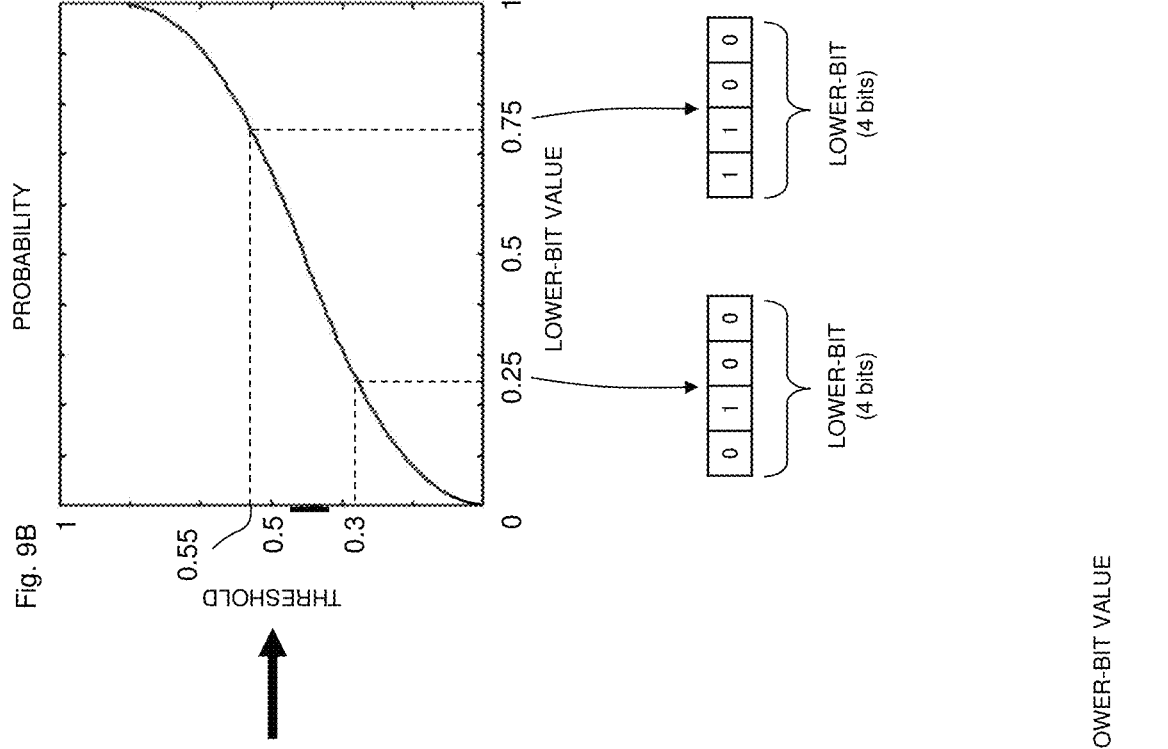
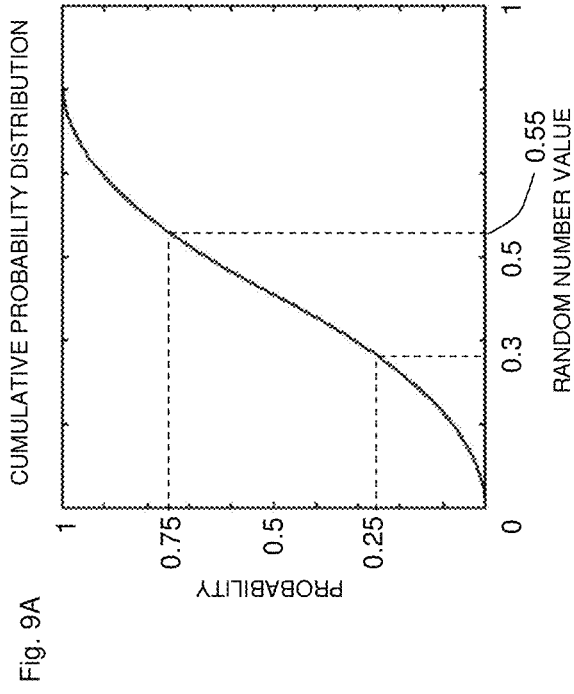
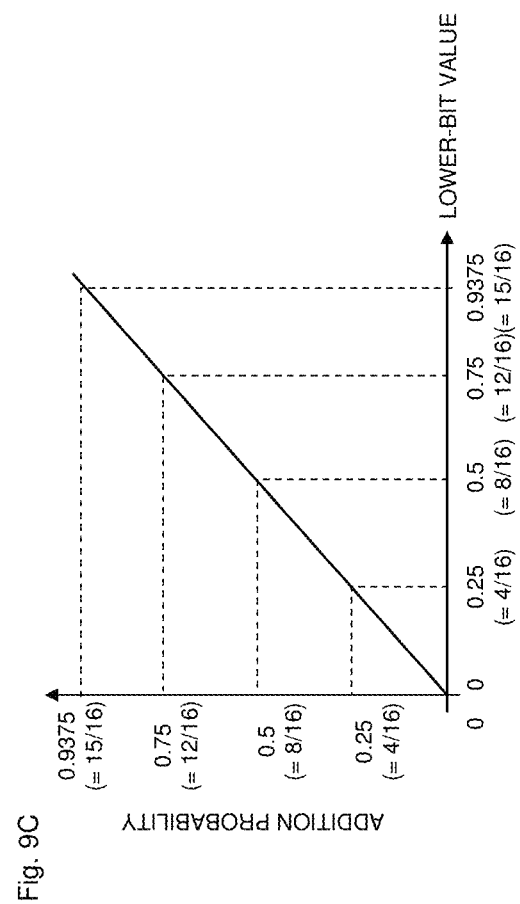

INFORMATION PROCESSING APPARATUS AND PROGRAM

TECHNICAL FIELD

The present disclosure relates to an information processing apparatus and program that are able to improve representable gradations in a pseudo manner.

BACKGROUND ART

As technologies that improve representable gradations in a pseudo manner by performing frame modulation on input image data having a deeper gradation depth than a gradation depth that can be driven by an image display device, there have been proposed so-called "frame rate control" (hereafter referred to as FRC) technologies, which control the gradations of pixels in each of frames, which are changed in a time series manner.

Patent Literature 1 discloses an image display method that is a technology which displays an image on an image display device on the basis of output data consisting of a smaller number of bits than the number of bits of input image data and that generates output image data having gradations equivalent to the gradations of input image data in a pseudo manner by adjusting the upper bits of the input image data using cyclic state transitions when extending the bit precision.

Referring now to FIG. 1, there will be described an algorithm used in a case where the image display method disclosed in Patent Literature 1 is used and where, for example, the lower 4 bits of 12-bit input image data are used to extend the precision and the upper 8 bits thereof are adjusted.

State transitions having cyclicity shown in FIG. 1 are defined for sixteen states representable by the lower 4 bits to be reduced. A to H are called state signs and show that when "1", luminance is added to the eighth bit of the upper 8 bits.

In FIG. 1, for description, states IDs 1 to 16 are given to the possible sixteen states of the lower 4 bits. The state number refers to the number of state signs and represents the cycle in which luminance is added (frame number).

For example, when input image data is represented by twelve bits "101110100100", it is divided into upper bits "10111010" and lower bits "0100" and then a state corresponding to the lower bits "0100" is identified. In FIG. 1, the lower bits "0100" corresponds to the state ID 5, and in this case, one bit is added to the upper bits "10111010" when the state sign is D and H.

That is, when the first frame of the input image data corresponds to the state sign A, the upper bits "10111010" are outputted as output data without change in the first to third frames (corresponding to the state signs A to C). On the other hand, in the fourth frame, the state sign D is 1. Accordingly, one bit is added to the upper bits "10111010", and "10111011" are outputted as output data.

Also in the fifth to seventh frames (corresponding to the state signs E to G), as in the first to third frames, the upper bits "10111010" are outputted as output data without change. In the eighth frame (corresponding to the state sign H), as in the fourth frame, one bit is added to the upper bits "10111010", and "10111011" are outputted as output data.

As seen above, when the lower bits are "0100", one bit is added to the upper bits in the two frames of the eight frames, allowing for representation of an intermediate gradation. That is, assuming that a gradation obtained by adding an extension bit to the upper bits in all frames is 1, when the state ID is 5, one bit is added to the upper bits at a frequency of twice in eight frames. Thus, 2/8 gradation, that is, 0.25 gradation can be represented in an pseudo manner due to an afterimage in human eyes.

The example in FIG. 1 is an example in which eight state signs are used. Accordingly, there is a gap between an ideal gradation (a gradation that has linearity with respect to the state ID and is increased by 1/16 each time the state ID is increased by 1) and an intermediate gradation (a pseudo gradation that can be actually represented in the example in FIG. 1). For example, when the state ID is 2, representing an ideal gradation requires adding an extension bit to the upper bits at a frequency of once in sixteen frames. However, the number of states is up to eight and therefore an ideal gradation is difficult to represent.

In FIG. 1, different state numbers 8, 7, 6, and 5 are set to the state IDs in order to make the intermediate gradations as linear as possible, that is, in order to bring the intermediate gradations as close as possible to the ideal gradations. That is, by setting the state number appropriately, the intermediate gradations are adjusted so as to be increased in steps as close as possible to 1/16. For example, when the state ID is 3, the ideal gradation is 0.125 (=2/16). For this reason, by setting the state number to 8 and adding one bit to the upper bits at a frequency of once in eight frames, an intermediate gradation 0.125 (=1/8) is realized. When the state ID is 14, the ideal gradation is 0.8125 (=13/16). For this reason, by setting the state number to 5 and adding one bit to the upper bits at a frequency of four times in five frames, an intermediate gradation 0.8 (=4/5) is realized.

CITATION LIST

Patent Literature

[Patent Literature 1] Japanese Unexamined Patent Application Publication No. 2000-231368

SUMMARY OF THE INVENTION

Technical Problem

The image display method disclosed in Patent Literature 1 uses cyclic state transitions in order to represent intermediate gradations. For this reason, an extension bit is cyclically added to the upper bits, and flicker is recognized by human eyes. This is because the cyclic increases in the luminance is conspicuous.

An example of technologies proposed to resolve this cyclicity-derived problem is one that randomizes the luminance increase timing by adding an extension bit to the upper bits when the random number value of a uniform random number sequence forming white noise falls below (or exceeds) a predetermined threshold. However, this technology also has a problem.

This problem will be described with reference to FIGS. 2A to 2C. FIG. 2A shows a combined wave (random number sequence) consisting of multiple high-frequency components and multiple low-frequency components, FIG. 2B shows the decomposed low-frequency components, and FIG. 2C shows the decomposed high-frequency components. For description, FIGS. 2A to 2C show an example in which the number of high-frequency components and the number of low-frequency components are each one.

Assuming that a random number sequence is a waveform, it can be decomposed into multiple high-frequency components and multiple low-frequency components by Fourier transform. However, as shown in FIGS. 2A to 2C, the time during which the random number value falls below the threshold, that is, the time during which a criterion for adding an extension bit to the upper bits is satisfied (hatched portion) is lengthened due to the influence of the low-frequency component. For this reason, even if the timing when an extension bit is added to the upper bits is randomized, such addition may be continuously performed or may not be performed for a while. In that case, again, flicker is recognized by human eyes.

The present invention has been made in view of the foregoing, and an object thereof is to provide an information processing apparatus and program that are able to improve the resolution in a pseudo manner while reducing flicker.

Solution to Problem

The present invention provides an information processing apparatus including a random number generator configured to generate a random number sequence, a comparator configured to make a comparison between a threshold and a random number value, the threshold being associated with any number of lower bits, the any number of lower bits forming input image data with any number of upper bits, the random number value forming the random number sequence, and an arithmetic unit configured to change a value of the upper bits of the input image data on the basis of a result of the comparison made by the comparator. The threshold is set so as to nonlinearly change with respect to a value of the lower bits, as well as is set such that linearity of a gradation after the value of the upper bits is changed is increased compared to when the threshold is set so as to linearly change with respect to the value of the lower bits.

According to the present invention, the random number sequence is generated, and the comparison is made between the random number value forming the random number sequence and the threshold associated with the lower bits included in input image data. The value of the upper bits of the input image data is changed on the basis of the result of the comparison. As seen above, by performing a predetermined process using the random number sequence, the problem of the example in FIG. 2 can be solved. Also, the threshold is set so as to nonlinearly change with respect to the value of the lower bits, as well as is set such that the linearity of the gradation after the value of the upper bits is changed is increased compared to when the threshold is set so as to linearly change with respect to the value of the lower bits. Thus, an intermediate gradation extremely close to the ideal gradation in the example in FIG. 1 can be realized.

Various embodiments of the present invention are described below. The embodiments below can be combined with each other.

Preferably, the arithmetic unit is configured to add or subtract one or more bits to or from the upper bits.

Preferably, the arithmetic unit is configured to output data represented by the upper bits subjected to the addition or subtraction, as output image data.

Preferably, the random number sequence is a random number sequence corresponding to a waveform obtained by reducing, from a uniform waveform including a low-frequency component of a predetermined frequency and a high-frequency component of a higher frequency than the low-frequency component, the low-frequency component, and the uniform waveform is a waveform represented by a uniform random number sequence.

Preferably, a power spectrum of the waveform corresponding to the random number sequence has an intensity distribution in which intensity is heavily distributed to a high-frequency side.

Preferably, the threshold is determined on the basis of a histogram of the random number value forming the random number sequence.

Preferably, the threshold is determined on the basis of a cumulative probability distribution of the random number value forming the random number sequence.

Preferably, the threshold is determined on the basis of an inverse function of a function represented by the cumulative probability distribution.

Preferably, the arithmetic unit performs an operation in each of frames forming the input image data.

Preferably, the lower bits and the threshold are associated with each other by an LUT or formula.

Preferably, the random number sequence is a random number sequence corresponding to a waveform obtained by reducing a frequency component having a greater contrast sensitivity function than a predetermined value from a uniform waveform including a low-frequency component of a predetermined frequency and a high-frequency component of a higher frequency than the low-frequency component, and the uniform waveform is a waveform represented by a uniform random number sequence.

Preferably, an image display device including any one of the information processing apparatuses is provided.

Preferably, there is provided an information processing program for causing a computer to function as a random number generator configured to generate a random number sequence, a comparator configured to make a comparison between a threshold associated with any number of lower bits, the any number of lower bits forming input image data with any number of upper bits, and a random number value forming the random number sequence, and an arithmetic unit configured to change a value of the upper bits of the input image data on the basis of a result of the comparison made by the comparator, wherein the threshold is set so as to nonlinearly change with respect to a value of the lower bits, as well as is set such that linearity of a gradation after frame modulation is increased compared to when the threshold is set so as to linearly change with respect to the value of the lower bits.

BRIEF DESCRIPTION OF DRAWINGS

FIGS. 2A to 2C are diagrams showing conventional FRC and are diagrams showing a technology that when, for example, a uniform random number sequence forming white noise is used and a random number value forming the random number sequence falls below a predetermined threshold, randomizes the luminance increase timing by adding an extension bit to the upper bits. FIG. 2A shows a combined wave (random number sequence) consisting of multiple high-frequency components and multiple low-frequency components, FIG. 2B shows the decomposed low-frequency components, and FIG. 2C shows the decomposed high-frequency components. For description, FIGS. 2A to 2C show an example in which the number of high-frequency components and the number of low-frequency components are each one.

FIG. 3A is a function block diagram of an information processing apparatus 10 according to an embodiment of the present invention, FIG. 3B is a conceptual diagram showing input data, and FIGS. 3C and 3D are conceptual diagrams showing output data.

FIG. 4 is a diagram showing the correspondences between the states of lower bits and lower-bit values, which are values represented by the lower bits, in the information processing apparatus 10 according to the embodiment of the present invention. In the present embodiment, the lower-bit value is linearly increased in steps of 1/16 for each of possible sixteen states of the lower-bit value.

FIG. 6 is a diagram showing a process of calculating the differences between random number values forming uniform random number sequences and obtaining a histogram of the differences in the example in FIG. 5.

FIG. 7A is a diagram showing a calculation result in an example in FIG. 6, FIG. 7B is a graph showing a histogram obtained by visualizing FIG. 7A, and FIG. 7C is a graph showing a histogram obtained by an actual experiment.

FIG. 9A is a graph showing a cumulative probability distribution generated from the histogram in FIG. 7C, FIG. 9B is a graph showing a threshold LUT determined on the basis of the inverse function of a function represented by a cumulative probability distribution shown in FIG. 9A, and FIG. 9C is a graph showing the relationship between the value of the lower bits included in input image data and the probability with which an extension bit is added to the upper bits. As shown in FIG. 9C, the linearity of a gradation obtained after the addition is increased by using the information processing apparatus 10 according to the embodiment of the present invention.

DESCRIPTION OF EMBODIMENTS

Figure 1:
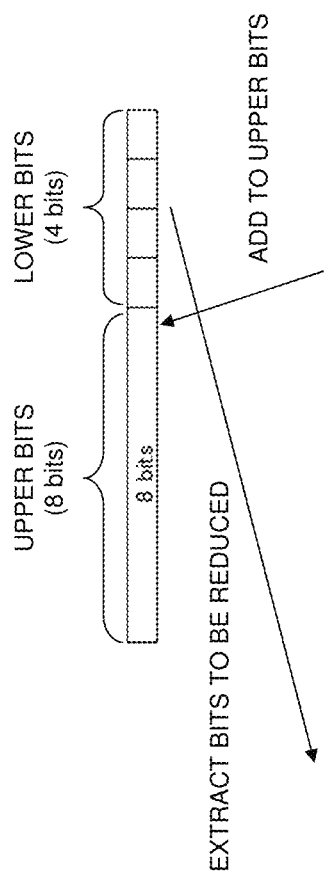
FIG. 1 is a diagram showing conventional FRC and is a diagram showing an algorithm used in a case where an image display method disclosed in Patent Literature 1 is used and where the lower 4 bits of 12-bit input image data are used to extend the precision and the upper 8 bits thereof are adjusted.

Now, an embodiment of the present invention will be described with reference to the drawings. Various features described in the embodiment below can be combined with each other.

Referring to FIGS. 1 to 9, an information processing apparatus 10 according to an embodiment of the present invention will be described.
<Information Processing Apparatus 10>
FIGS. 3A to 3D are diagrams showing the information processing apparatus 10 according to the embodiment of the present invention. FIG. 3A is a function block diagram of the information processing apparatus 10 according to the embodiment of the present invention, FIG. 3B is a conceptual diagram showing input image data (hereafter referred to as input data), and FIGS. 3C and 3D are conceptual diagrams showing output image data (hereafter referred to as output data).

The information processing apparatus 10 includes a random number generator 1, a filter 2, a threshold LUT 3, a comparator 4, and an adder 5. In the present embodiment, the random number generator 1 and filter 2 form a non-uniform random number generator 6. The adder 5 is an example of an arithmetic unit that changes a value of upper bits that form input data with lower bits. As used herein, the phase "change a value of upper bits" refers to adding or subtracting one or more bits to or from the upper bits. In the present embodiment, these elements form a frame modulator 7 that performs FRC.

These functions may be implemented by software or hardware. When implemented by software, the functions may be implemented by causing a CPU to execute a program. The program may be stored in a built-in memory or a computer-readable non-transitory storage medium. The program may also be stored in an external memory and then be read so that the functions are implemented by so-called cloud computing. When implemented by hardware, the functions may be implemented using various circuits such as ASIC, FPGA, and DRP.

As shown in FIG. 3A, the information processing apparatus 10 receives input data. In the present embodiment, an example in which the input data is 12 bits will be described. As shown in FIG. 3B, the upper 8 bits of the 12 bits are referred to as the upper bits, and the lower 4 bits as the lower bits. The information processing apparatus 10 of the present embodiment reduce the lower 4 bits from the 12-bit input data, as well as adjusts the upper 8 bits on the basis of the state of the lower 4 bits.

In the present embodiment, as shown in FIG. 4, lower-bit values, which are values represented by the lower bits, are set for the respective states of the lower bits. In the present embodiment, the lower bits are four bits and therefore can take sixteen states from "0000" to "1111". The lower-bit values are associated with the states of the lower bits such that the lower-bit value is changed by 1/16 each time the state of the lower bits is changed by 1. The associations are stored in a storage (not shown). The significance of the lower-bit values will be described later.

The random number generator 1 generates, for example, a uniform random number sequence forming white noise. In the present embodiment, it generates values from 0 to 1 as a uniform random number sequence. The random number generator 1 then outputs the random number values (uniform random number values in the diagram) forming the uniform random number sequence to the filter 2.

The filter 2 generates a non-uniform random number sequence, in which random numbers are not distributed uniformly, in a range of 0 to 1. Specifically, the filter 2 generates a random number sequence corresponding to a waveform obtained by reducing the low-frequency components from the uniform waveform generated by the random number generator 1. As used herein, the term "uniform waveform" refers to a waveform including the low-frequency components of a predetermined frequency and the high frequency components of a higher frequency than the low-frequency components. Thus, a non-uniform random number sequence, in which random numbers are not distributed uniformly, is generated. That is, the random number generator 1 and filter 2 form the non-uniform random number generator 6. An algorithm for generating a non-uniform random number sequence will be described below.

<Non-Uniform Random Number Sequence>

Figure 5:
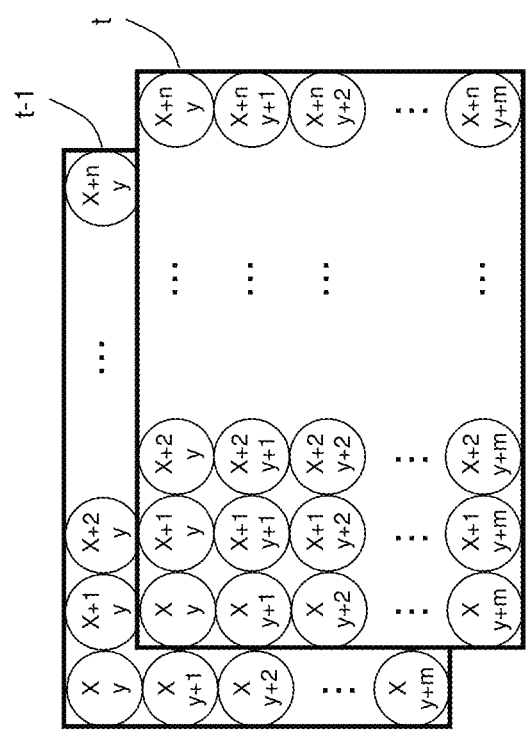
FIG. 5 is a conceptual diagram showing an example of an algorithm for generating a non-uniform random number sequence from a uniform random number sequence, in which circles show pixels on the display surface of an image display device.

FIG. 5 is a conceptual diagram showing an example of an algorithm for generating a non-uniform random number sequence from a uniform random number sequence, in which circles show pixels on the display surface of an image display device. (x,y) represents coordinates specifying the position of each pixel. In the example in FIG. 5, n pixels are present in an x-direction, and m pixels are present in a y-direction. A front image represents a frame at time t, and a back image represents a frame at time t−1.

Here, it is assumed that a random number value (uniform random number value) outputted by the random number generator 1 to a pixel specified by coordinates (x,y) in the frame at time t is R(x,y,t) where R is in a range of 0 to 1. The filter 2 performs predetermined correction on a value obtained from "R(x,y,t)−R(x,y,t−1)" and outputs the resulting value "N(x,y,t) where N is in a range of 0 to 1" as a random number value (non-uniform random number value). This will be described with reference to FIGS. 6 and 7.

FIG. 6 is a table in which the possible values of R(x,y,t) are arranged in the uppermost row, the possible values of R(x,y,t−1) are arranged in the leftmost row, and the differences "R(x,y,t)−R(x,y,t−1)" therebetween are arranged at intersections.

FIG. 7A is a diagram showing frequencies corresponding to these differences. As shown in FIGS. 6 and 7A, the differences (corresponding to "R(x,y,t)−R(x,y,t−1)") are in a range of "−1 to +1". To change this range to a range of "0 to 1", predetermined correction is performed on the differences. Specifically, the differences are uniformly multiplied by "0.5", and "0.5" is added to the results.

The differences resulting from the predetermined correction are referred to as the corrected differences, and the corrected differences are in a range of "0 to 1", as shown in FIG. 7A. As shown in FIG. 7B, frequencies corresponding to the corrected differences form a histogram having a peak of 0.5. In the present embodiment, the corrected differences are used as non-uniform random number values. On the other hand, a histogram obtained in an actual experiment is shown in FIG. 7C. In an example in FIG. 7C, the frequency of occurrence of a random number value is 100,000.

Figure 8B:
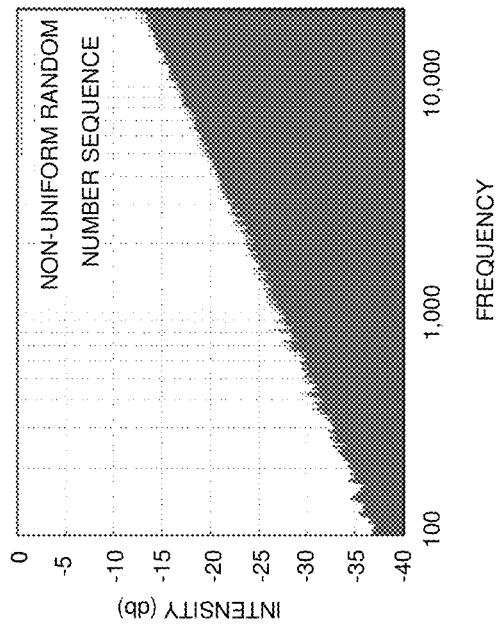
FIG. 8B is a graph showing an example of the power spectrum of a non-uniform random number sequence.
Figure 8A:
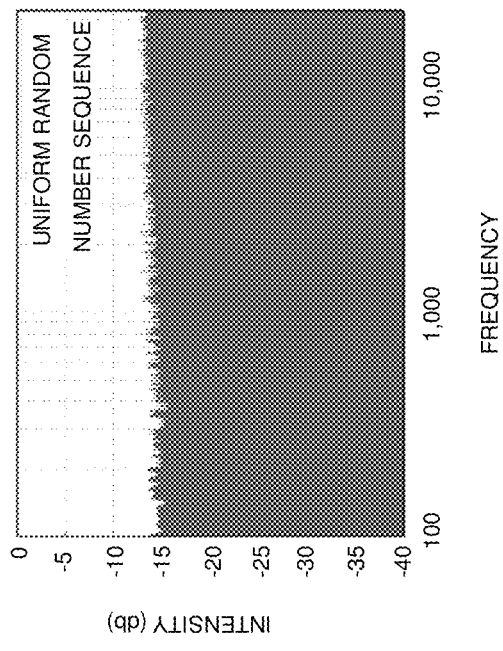
FIG. 8A is a graph showing an example of the power spectrum of an uniform random number sequence.

This histogram has a power spectrum shown in FIG. 8B. As shown in FIG. 8B, this power spectrum has an intensity distribution in which the intensity is heavily distributed to the high-frequency side. This power spectrum corresponds to so-called blue noise. On the other hand, the power spectrum of the uniform random number sequence generated by the random number generator 1 takes a shape as shown in FIG. 8A. In the power spectrum of the uniform random number sequence, the intensity is uniformly distributed at all frequencies. This power spectrum corresponds to so-called white noise.

As seen above, the random number generator 1 and filter 2 work together to generate the random number sequence (blue noise) corresponding to the waveform obtained by eliminating the low-frequency components from the waveform (while noise) represented by the uniform random number sequence generated by the random number generator 1 and including the low-frequency components of the predetermined frequency and the high-frequency components of the higher frequency than the low-frequency components. That is, in the present embodiment, the random number generator 1 and filter 2 function as the non-uniform random number generator 6.

The above method requires previously storing at least information about the frame at time t and the frame at time t−1 in the memory. The above difference calculation may be performed each time one frame of input data is inputted. Also, if the memory has enough space, for example, non-uniform random number sequences corresponding to tens of thousands of frames may be previously calculated and stored in the memory. In this case, each time one frame of input data is inputted, random number values corresponding to the one frame may be outputted from the previously stored non-uniform random number sequences. Also, instead of using the memory, two reproducible random number generators (a, b) may be used. For example, the random number generator (a) generates a random number R(x,y,t) for each pixel at time t, and the random number generator (b) simultaneously reproduces a random number R(x,y,t−1) by be previously given the internal state of the random number generator (a) at time t−1.

Also, instead of using the above method, a non-uniform random number sequence may be generated by applying any type of high-pass filter that blocks the low-frequency components, to a uniform random number sequence generated by the random number generator 1.

Referring back to FIG. 3, the threshold LUT 3, comparator 4, and adder 5 will be described.

The threshold LUT 3 is a LUT storing thresholds corresponding to the lower-bit values (see FIG. 4) represented by the lower bits of input data. When the threshold LUT 3 receives input data, it extracts the lower bits and obtains a corresponding lower-bit value. The threshold LUT 3 then outputs a threshold corresponding to the obtained lower-bit value to the comparator 4.

The comparator 4 makes a comparison between the non-uniform random number value outputted from the filter 2 and the threshold outputted from the threshold LUT 3 and determines whether a predetermined criterion is met. In the present embodiment, the comparator 4 determines that the predetermined criterion is met when the non-uniform random number value falls below the threshold. When the non-uniform random number value falls below the threshold, the comparator 4 outputs 1 to the adder 5; otherwise, it outputs 0 to the adder 5.

The adder 5 adds the bit outputted from the comparator to the upper bits. The adder 5 then outputs data represented by the upper bits subjected to the addition, as output data.

Specifically, when the input data shown in FIG. 3B is inputted and the non-uniform random number value falls below the threshold as a result of the comparison made by the comparator 4, the adder 5 adds one bit to the upper bits (FIG. 3C). The adder 5 then outputs the resulting data as output data. On the other hand, when the non-uniform random number value exceeds the threshold, the adder 5 does not perform addition and outputs the upper bits of the input data as output data without change.

When the input data is in a state shown in FIG. 3B, a lower-bit value corresponding to the lower bits "0100" is "0.25" (FIG. 4). Accordingly, it is ideal that the adder 5 perform addition with a frequency of once in four frames (¼=0.25). This is realized by generating the threshold LUT 3 properly.

Referring now to FIGS. 9A to 9C, a method for making the threshold LUT 3 will be described.

<Generation of Threshold LUT 3>

FIG. 9A shows a cumulative probability distribution generated from the histogram of the random number value outputted from the filter 2 shown in FIG. 7C. For example, the probability with which the random number value falls below 0.3 is equal to the area of a portion whose value falls below 0.3, of the histogram shown in FIG. 7C (the area of an approximate triangle in the region to the left of the broken line D in FIG. 7C). In the present embodiment, the probability is calculated assuming that the area of a portion whose value falls below 1, of the histogram, that is, the entire area of an approximate triangle represented by the histogram is 1.

As shown in FIG. 9A, in the present embodiment, the area of the portion whose value falls below 0.3, of the histogram is 0.25, and the area of a portion whose value falls below 0.55 is 0.75. FIG. 9A is a graph obtained by performing this calculation while changing the value of the histogram in a range of 0 to 1. In other words, FIG. 9A, which has a horizontal axis corresponding to the random number value and a vertical axis corresponding to the probability, shows, for example, that the probability with which the random number value outputted from the filter 2 falls below 0.3 is 0.25; the probability with which the random number value falls below 0.5 is 0.5; and the probability with which the random number value falls below 0.55 is 0.75.

The probability distribution shown in FIG. 9A is nonlinear, and if an extension bit is added to the upper bits on the basis of the random number value represented by this probability distribution, a gradation value represented by the upper bits subjected to the addition does not change linearly.

Figure 11B:
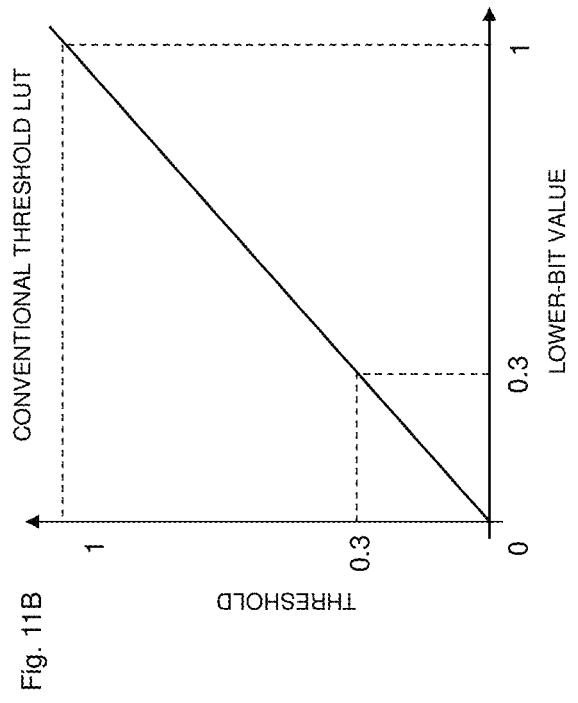
FIG. 11B is a graph showing a threshold LUT in conventional FRC.
Figure 11A:
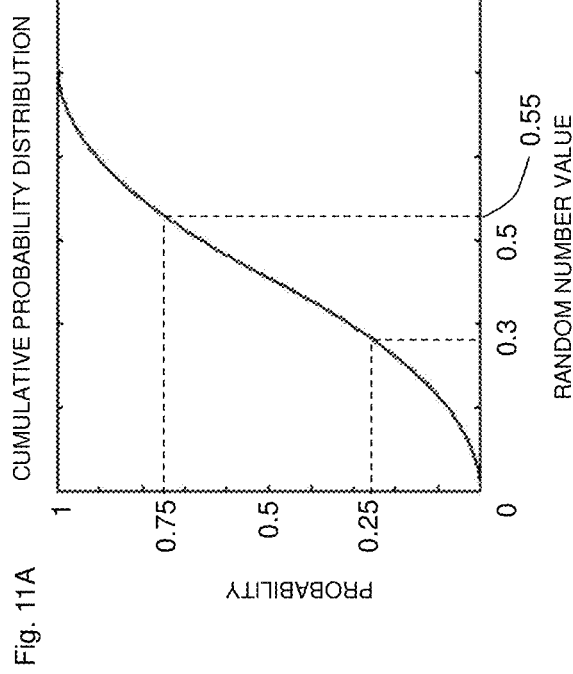
FIG. 11A is a graph showing a cumulative probability distribution similar to that in FIG. 9A.
Figure 11C:
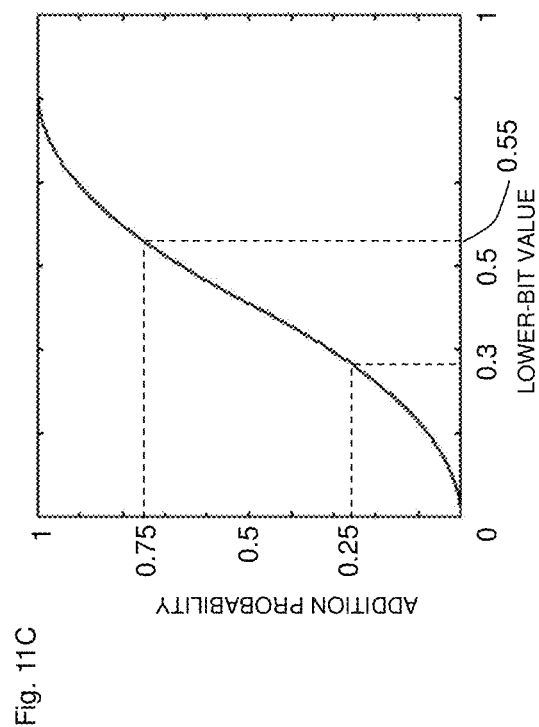
FIG. 11C is a graph showing the relationship between the lower-bit value and the probability with which an extension bit is added to the upper bits.

This will be described with reference to FIGS. 11A to 11C. FIG. 11A is a graph showing a cumulative probability distribution similar to FIG. 9A, FIG. 11B is a graph showing a threshold LUT in conventional FRC, and FIG. 11C is a graph showing the relationship between the lower-bit value and the probability with which an extension bit is added to the upper bits.

For example, when the lower-bit value is 0.3, it is preferred to add an additional bit with a probability of 0.3 (=3/10). However, if a threshold of 0.3 corresponding to a lower-bit value of 0.3 as shown in FIG. 11B is used without change, the probability with which the random number value falls below 0.3 becomes "0.25" according to FIG. 11A. That is, when the lower-bit value is 0.3, an additional bit is added to the upper bits with a probability of 0.25 (=¼). As a result, as shown in FIG. 11C, a gradation value represented by the upper bits subjected to the addition does not change linearly.

For this reason, the threshold LUT 3 shown in FIG. 9B is used to increase the linearity of the gradation value represented by the upper bits subjected to the addition. The threshold LUT 3 is generated using the following method.

For example, when the lower bits of input data are "0100", that is, the lower-bit value is "0.25", it is required to add an extension bit to the upper bits with a probability of once in 4 frames. For this reason, when the lower-bit value is "0.25", the probability with which the random number value falls below the threshold has to be 0.25(=¼). The cumulative probability distribution in FIG. 9A shows that when the random number value falls below 0.3, the probability becomes 0.25. Accordingly, by setting the threshold corresponding to the lower-bit value "0.25" to "0.3", the probability with which the random number value falls below the threshold becomes 0.25 when the lower-bit value is "0.25".

When the lower bits are "1100", that is, the lower-bit value is "0.75", it is required to add an extension bit to the upper bits with a probability of three times in 4 frames. For this reason, when the lower-bit value is "0.75", the probability with which the random number value falls below the threshold has to be 0.75(=¾). The cumulative probability distribution in FIG. 9A shows that when the random number value falls below 0.55, the probability becomes 0.75. Accordingly, by setting the threshold corresponding to the lower-bit value "0.75" to "0.55", the probability with which the random number value falls below the threshold becomes 0.75 when the lower-bit value is "0.75".

As seen above, the threshold corresponding to the lower-bit value is determined with reference to the cumulative probability distribution in FIG. 9A. That is, the threshold corresponding to the lower-bit value is determined by determining the random number value corresponding to the probability having the same value as this lower-bit value. This corresponds to obtaining the inverse function of a function represented by the cumulative probability distribution in FIG. 9A.

As seen above, the inverse function of the function represented by the cumulative probability distribution shown in FIG. 9A is obtained, and this inverse function is used as the threshold LUT 3 shown in FIG. 9B.

That is, in the present embodiment, the threshold is determined on the basis of the histogram of the random number value forming the non-uniform random number sequence. Also, the threshold is determined on the basis of the cumulative probability distribution of the random number value forming the non-uniform random number sequence. Also, the threshold is determined on the basis of the inverse function of the function represented by the cumulative probability distribution While, in the present embodiment, the threshold is determined on the basis of the cumulative probability distribution obtained when the random number value falls below the predetermined value included in the histogram, it may be determined otherwise. For example, the threshold may be determined on the basis of the probability with which the random number value becomes equal to or smaller than the predetermined value included in the histogram, or the probability with which the random number value exceeds the predetermined value included in the histogram, or the probability with which the random number value becomes equal to or greater than the predetermined value included in the histogram. If the probability with which the random number value becomes equal to or greater than the predetermined value included in the histogram or the probability with which the random number value exceeds the predetermined value included in the histogram, the graphs in FIGS. 9A and 9B are vertically inverted.

Instead of the threshold LUT 3, a formula representing the correspondence between the lower-bit value and the threshold may be used. In this case, the formula is stored in a storage (not shown), and a threshold is calculated on the basis of the formula each time addition is performed.

FIG. 9C is a graph showing the relationship between the lower-bit value and the probability with which an extension bit is added to the upper bits, obtained using the above threshold LUT 3. As shown in FIG. 9C, the linearity of a gradation obtained after the addition is increased by using the information processing apparatus 10 according to the embodiment of the present invention. For example, when the lower bits are "0100", that is, the lower-bit value is "0.25 (=4/16)", the probability with which an extension bit is added to the upper bits becomes 0.25 (=4/16). Also, when the lower bits are "1000", that is, the lower-bit value is "0.5 (=8/16)", the probability with which an extension bit is added to the upper bits becomes 0.5 (=8/16). Also, when the lower bits are "1100", that is, the lower-bit value is "0.75 (=12/16)", the probability with which an extension bit is added to the upper bits becomes 0.75 (=12/16). Also, when the lower bits are "1111", that is, the lower-bit value is "0.9375 (=15/16)", the probability with which an extension bit is added to the upper bits becomes 0.9375 (=15/16). As seen above, it is possible to linearize the gradations obtained after the addition in accordance with the possible 16 states of the lower bits.

As described above, the information processing apparatus 10 according to the embodiment of the present invention includes the non-uniform random number generator 6 that generates a non-uniform random number sequence, the comparator 4 that makes a comparison between a threshold corresponding to any number of lower bits, the lower bits forming input image data with any number of upper bits, and a random number value forming the non-uniform random number sequence, and the arithmetic unit (adder 5) that changes a value of the upper bits of the input image data on the basis of a result of the comparison made by the comparator 4. In the present embodiment, the adder 5 is used as the arithmetic unit and is configured to add one bit to the upper bits. The threshold is set so as to change nonlinearly with respect to the lower-bit value (see FIG. 9B), as well as is set such that the linearity of a gradation obtained after the addition is increased compared to when the threshold is set so as to change linearly with respect to the lower-bit value (see FIG. 9C). Also, the arithmetic unit (adder 5) is configured to output data represented by the upper bits subjected to the addition, as output image data.

The above process is performed in each frame. This process is also performed for each pixel included in each frame.

This configuration allows the timing when an extension bit is added to the upper bits to be randomized using the random number sequence, as well as allows the linearity of a gradation obtained after the addition to be increased using the threshold set using the cumulative probability distribution. Thus, an extension bit can be non-cyclically added to the upper bits. As a result, this configuration can improve the resolution in a pseudo manner while reducing flicker, compared to conventional FRC, which cyclically performs addition.

Application Example

Figure 10:
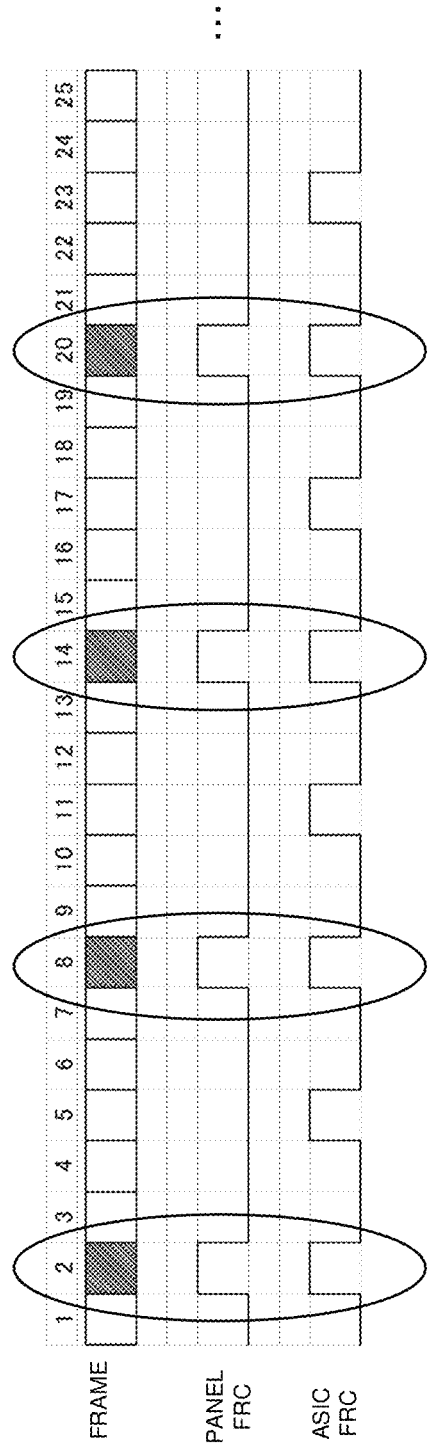
FIG. 10 is a conceptual diagram showing an example of interference that occurs when FRC is performed both in the display panel of an image display device and an ASIC.

Referring now to FIG. 10, an application example of the information processing apparatus 10 will be described.

FIG. 10 is a diagram showing an example of interference that occurs in a case where conventional FRC is performed both in the display panel of an image display device and an ASIC incorporated into the image display device. Such cases include one in which 12-bit input data is represented with a 8-bit pseudo-gradation by FRC in the ASIC and the 8-bit pseudo-gradation is represented with a 6-bit pseudo-gradation by FRC in the display panel.

In FIG. 10, the upper level shows the frame number of input data, the middle level shows the timing when an extension bit is added to the upper bits in the display panel, and the lower level shows the timing when an extension bit is added to the upper bits in the ASIC. In the example in FIG. 10, an extension bit is added to the upper bits in the display panel in the 2nd, 8th, 14th, and 20th frames. That is, FRC in the display panel cyclically adds an extension bit to the upper bits at a frequency of once in 6 frames.

On the other hand, in the ASIC, an extension bit is added to the upper bits in the 2nd, 5th, 8th, 11th, 14th, 17th, and 20th frames. That is, FRC in the ASIC cyclically adds an extension bit to the upper bits at a frequency of once in three frames.

Due to these cyclicities, FRC in the display panel and FRC in ASIC simultaneously add an extension bit to the upper bits in the 2nd, 8th, 14th, and 20th frames shown by ellipses in the diagram. Consequently, the signals thereof interfere with each other, causing a failure, such as image flicker or stripe waviness, on the display panel.

On the other hand, when FRC is performed both in the display panel and ASIC using the information processing apparatus 10 according to the embodiment of the present invention, the frequency of the interference is reduced. This is because the respective timings when an extension bit is added to the upper bits in the display panel and the ASIC are randomly determined on the basis of the random number value and therefore cyclical interference as seen in FIG. 10 does not occur.

Next, an example in which the contrast sensitivity function (CSF) is reduced using the information processing apparatus 10 according to the embodiment of the present invention will be described.

The contrast sensitivity function (CSF) is a function obtained by sensorily evaluating the visual characteristics of a human. More specifically, the CSF is obtained by showing a subject an image on which the waves of various spatial frequencies are displayed and modeling the visual sensitivities of the human to the spatial frequencies from data about the points at which the waves disappear.

By designing a filter 2 that reduces frequency components having a high CSF in place of the filter 2 that eliminates the low-frequency components from the waveform represented by the uniform random sequence and including the low-frequency components of the predetermined frequency and the high-frequency components of the higher frequency than the low-frequency components, a pattern (or flicker) made by an extension bit can be made less visible for a human.

<Others>

While the embodiment has been described, the information processing device 10 according to the present invention is not limited thereto.

For example, instead of one bit, two bits may be added to the upper bits. In this case, two bits are added with a probability that is ½ of the probability with which one bit is added. Also, if necessary, more bits may be added.

Instead of adding one bit to the upper bits, one bit may be subtracted from the upper bits. For example, instead of adding one bit with a probability of 1/16, one bit may be subtracted with a probability of 1/16 or 15/16.

The non-uniform random number generator 6 may consist of a single random number generator. Also, input data and output data may consist of any number of bits other than 12 bits and 8 bits. Also, the configuration which outputs a uniform random number sequence generated by the random number generator 1 as a non-uniform random number sequence through the filter 2, as shown in FIG. 3, is only illustrative. Any type of random number generator serves as the information processing apparatus 10 as long as it has a histogram as shown in FIG. 7B.

The information processing apparatus 10 may be provided as a PC, a server or computer, or a set-top box connected to an image display device. Also, an image display device including the information processing apparatus 10 may be provided. A computer-readable non-transitory storage medium having the functions of the information processing apparatus 10 implemented thereon may be provided. A program for implementing the functions of the information processing apparatus 10 may be distributed through the Internet or the like.

The elements of the information processing apparatus 10 may be contained in the same case, or may be disposed in multiple cases in a distributed manner.

DESCRIPTION OF REFERENCE SIGNS

1: random number generator
2: filter
3: threshold LUT
4: comparator
5: adder
6: non-uniform random number generator
7: frame modulator
10: information processing apparatus

The invention claimed is:

1. An information processing apparatus comprising:
   a random number generating circuit configured to generate a random number sequence;
   a comparator configured to make a comparison between a threshold and a random number value,
      the threshold being associated with any number of lower bits,
      the any number of lower bits forming input image data with any number of upper bits,
      the random number value forming the random number sequence; and
   an arithmetic unit configured to change a value of the upper bits of the input image data on the basis of a result of the comparison made by the comparator,
   wherein
   the threshold is set so as to nonlinearly change with respect to a value of the lower bits, as well as is set such that linearity of a gradation after the value of the upper bits is changed is increased compared to when the threshold is set so as to linearly change with respect to the value of the lower bits.

2. The information processing apparatus of claim 1, wherein the arithmetic unit is configured to add or subtract one or more bits to or from the upper bits.

3. The information processing apparatus of claim 2, wherein the arithmetic unit is configured to output data represented by the upper bits subjected to the addition or subtraction, as output image data.

4. The information processing apparatus of claim 1, wherein the random number sequence is a random number sequence corresponding to a waveform obtained by reducing, from a uniform waveform including a low-frequency component of a predetermined frequency and a high-frequency component of a higher frequency than the low-frequency component, the low-frequency component, and
   the uniform waveform is a waveform represented by a uniform random number sequence.

5. The information processing apparatus of claim 1, wherein a power spectrum of the waveform corresponding to the random number sequence has an intensity distribution in which intensity is heavily distributed to a high-frequency side.

6. The information processing apparatus of claim 1, wherein the threshold is determined on the basis of a histogram of the random number value forming the random number sequence.

7. The information processing apparatus of claim 1, wherein the threshold is determined on the basis of a cumulative probability distribution of the random number value forming the random number sequence.

8. The information processing apparatus of claim 7, wherein the threshold is determined on the basis of an inverse function of a function represented by the cumulative probability distribution.

9. The information processing apparatus of claim 1, wherein the arithmetic unit performs an operation in each of frames forming the input image data.

10. The information processing apparatus of claim 1, wherein the lower bits and the threshold are associated with each other by an LUT or formula.

11. The information processing apparatus of claim 1, wherein
   the random number sequence is a random number sequence corresponding to a waveform obtained by reducing a frequency component having a greater contrast sensitivity function than a predetermined value from a uniform waveform including a low-frequency component of a predetermined frequency and a high-frequency component of a higher frequency than the low-frequency component, and
   the uniform waveform is a waveform represented by a uniform random number sequence.

12. An image display device comprising the information processing apparatus of claim 1.

13. A non-transitory computer readable medium that stores an information processing program for causing a computer to function as:
   a random number generator configured to generate a random number sequence;
   a comparator configured to make a comparison between a threshold and a random number value,
      the threshold being associated with any number of lower bits,
      the any number of lower bits forming input image data with any number of upper bits,
      the random number value forming the random number sequence; and
   an arithmetic unit configured to change a value of the upper bits of the input image data on the basis of a result of the comparison made by the comparator,
   wherein
   the threshold is set so as to nonlinearly change with respect to a value of the lower bits, as well as is set such that linearity of a gradation after frame modulation is increased compared to when the threshold is set so as to linearly change with respect to the value of the lower bits.

* * * * *